3,030,413
METHYLATED BENZENE OXIDATION
Milton A. Taves, Wilmington, Del., assignor to Hercules Powder Company, Wilmington, Del., a corporation of Delaware
No Drawing. Continuation of application Ser. No. 428,368, May 7, 1954. This application July 11, 1960, Ser. No. 41,761
3 Claims. (Cl. 260—524)

This invention relates to an improved process for the oxidation of aromatic hydrocarbons. In a specific aspect, this invention relates to an improved process for the oxidation of alkylated benzenes. In a more specific aspect, this invention relates to an improved process for the oxidation of p-xylene to p-toluic acid.

In the air oxidation of aromatic hydrocarbons, such as alkylated benzenes, a variety of undesirable ester intermediates are formed. For example, in the air oxidation of p-xylene to p-toluic acid, esters such as p-methylbenzyl p-toluate and p-carboxybenzyl p-toluate are formed. Such esters are undesirable primarily because they lead to the formation of slimy oxidates with small crystal sizes that are exceedingly difficult to filter. Furthermore, these esters represent a yield loss if they are not converted to p-toluic acid. When the oxidation is carried out at atmospheric pressure, the esters can accumulate to concentrations as high as 40% and 50%. When the oxidation is carried out at superatmospheric pressures, less esters are formed, but sufficient esters are formed at superatmospheric pressures to present problems such as the necessity for disposing of the esters and loss of xylene in the formation of the esters.

It has been found that the ester number of the oxidate resulting from the air oxidation of an alkylated benzene, such as p-xylene, can be substantially reduced by carrying out the oxidation reaction in the presence of water. The water presumably reduces the esters formed during the oxidation reaction by hydrolysis. However, it is possible that the presence of the water alters the reaction in a manner more complex than simple hydrolysis. Regardless of the manner in which the ester number of the oxidate is reduced, the presence of the water has been found to affect the reaction mechanism in such a way that the amount of ester in the oxidate is substantially reduced or completely eliminated, and the attendant problems are similarly reduced or eliminated.

*Example 1*

Two thousand parts by weight of p-xylene were charged to a stainless steel autoclave along with 180 p.p.m. of cobalt as cobaltous toluate. Air was passed through the p-xylene at a rate of 3 liters per kilogram per minute for a period of about 10 hours at a temperature of 125° C. and at atmospheric pressure. The oxidate from this reaction had an acid number of 205 and an ester number of 41.

*Example 2*

Two thousand parts by weight of p-xylene were charged to a stainless steel autoclave along with 4 parts of cobaltous toluate. Air was passed through the p-xylene at a rate of 20 s.c.f. per kilogram p-xylene per hour for a period of about 2 hours at a temperature of 140° C. and a pressure of 150 p.s.i.g. About 86.3 parts of water were formed during the oxidation. The water of reaction that appeared in the off-gas from the reactor was removed from the system and was not returned to the reactor. The oxidate from this reaction was found to have an acid number of 200 and an ester number of 22.5.

*Example 3*

At the conditions employed in Example 2, p-xylene was oxidized to p-toluic acid, but water was retained in the reaction medium by condensing it from the off-gas and returning it to the reactor. About 88.6 parts of water were formed during the oxidation. The oxidate from this reaction had an acid number of 222.5 and an ester number of 1.7. By comparing the analyses of the oxidates from these two examples, it is apparent that the presence of the water substantially reduced the ester number of the oxidate.

Example 1 demonstrates that, when the oxidation reaction is effected at conditions permitting substantially complete removal of water, the oxidate has a relatively high ester number. Example 2 indicates that by increasing the reaction pressure from atmospheric to 150 p.s.i.g. it is possible to reduce the ester content of the oxidate. Example 3 when compared with Example 2 demonstrates that at the same reaction conditions it is possible to reduce the ester number even further by returning the water of reaction to the system.

*Example 4*

At the conditions employed in Example 1, a mixture of 1330 parts by weight of p-xylene, 670 parts by weight of water, and 4.0 parts by weight of cobaltous acetate were contacted with air for a period of 3 hours. At the end of this time, it was found that substantially no oxygen absorption had taken place indicating that there had been substantially no oxidation of the p-xylene. The presence of the water in the autoclave made it difficult, if not virtually impossible, to start the oxidation at the conditions employed.

In practicing this invention, the oxidation of the alkylated benzene is carried out at a temperature and pressure such that the oxidation reaction medium is in the liquid phase. The temperature can vary from about 80° C. to about 250° C. with a preferable temperature range being about 125° to 175° C. A temperature of at least 110° C. is essential in order for the reaction to proceed at a practical rate. The pressure is suitably adjusted to maintain the oxidation medium in the liquid phase, and usually a superatmospheric pressure of from 15 to 400 p.s.i.g. and higher is used. At low pressures the formation of undesired esters presents a greater problem in such an oxidation, and this invention is particularly useful at low pressures, for example, a superatmospheric pressure not in excess of 200 p.s.i.g., in minimizing the problems caused by ester formation. However, the invention can be practiced at high pressures, and when that is done the problems encountered by undesirable ester formation are also reduced. The invention can be practiced by raising the oxidation pressure to a level at which sufficient water is retained in the system to reduce the ester content of the oxidate substantially. However, lower pressures, for example, 15 to 400 p.s.i.g. and preferably 50 to 175 p.s.i.g., are often desirable to reduce equipment and operating costs. At these lower pressures, sufficient water is ordinarily not retained in the system to produce the desired reduction of ester content as demonstrated by Example 3 above. At these lower pressures, the invention is practiced by adding water to the oxidation reaction either by returning water of reaction to the oxidation or by introducing water to the oxidizer from an outside source.

In carrying out the oxidation, a cobalt salt of an organic acid preferably is employed. Such cobalt salts as cobalt toluate, cobalt naphthenate, cobalt acetate, and cobalt salts of saturated aliphatic acids containing from about 6 to 12 carbon atoms can be used. The amount of catalyst that is employed to effect the oxidation is variable, and generally from 10 to 400 parts per million of cobalt are present in the oxidation reaction medium. However, it will be realized that catalyst concentrations outside this range and other metal catalyst than cobalt can be used when desired. Suitable catalysts for the oxidation reaction are those that are known for use in oxidation with gaseous oxygen. Salts of metals having more than one valence and selected from the group consisting of cobalt, manganese, iron and mercury can be used.

The hydrocarbons that are oxidized in accordance with this invention are the alkylated benzenes. For example, toluene, the xylenes, ethylbenzene, propylbenzene, and the like, can be employed. The preferred hydrocarbons are of the dialkyl type and the alkyl groups usually contain no more than about 4 carbon atoms per alkyl group. Any of the xylenes can be oxidized in accordance with this invention, and it is preferred to oxidize p-xylene to p-toluic acid. This acid is quite useful in the production of dimethyl terephthalate since it can be esterified to the monoester which, after another oxidation, can be esterified to the diester.

To effect the oxidation, an oxygen-containing gas is passed through the liquid reaction medium. Air is the preferred oxygen-containing gas. However, if desired, substantially pure oxygen as well as oxygen-enriched or oxygen-depleted air can be employed. However, in most instances, air will be used as the oxidizing agent. It is usually desirable to employ the oxygen-containing gas at a rate such that the off-gas from the reactor contains up to about 5% or 10% oxygen by volume.

The amount of water that is necessary in the reaction medium is dependent upon the reaction conditions employed. At certain conditions, for example, at atmospheric pressure, greater amounts of esters are formed than at superatmospheric pressures because water cannot readily be retained in the reaction mixture at atmospheric pressure. Regardless of the reaction conditions, the amount of water that is employed is sufficient to substantially reduce the ester number of the oxidate. In general, the reaction medium contains a water concentration within the range of 0.5% to 50% by weight. Lesser amounts will reduce the ester number to a lesser extent, but greater amounts can be used when desired. Usually an amount of water at least stoichiometrically equivalent to the esters formed during the oxidation is used. An amount in excess of the stoichiometric equivalent can be used to assure substantially complete removal of the esters. It is also frequently advantageous to employ water in excess of the stoichiometric equivalent to provide a method for either controlling or aiding in the control of the reaction temperature. The oxidation is exothermic, and, when an excess of water is employed, exothermic heat of reaction can be dissipated by evaporation of water introduced to the system.

The water that is essential for practicing this invention can be a product of the oxidation reaction. One method of retaining sufficient water in the reaction medium involves the use of pressures sufficiently high to permit such retention. However, the method necessitates the use of costly high pressure equipment and procedures. A method for use at lower pressures is similar to that described in Example 3 above. In this method the reaction temperature and pressure are such that part of the water from the reaction medium leaves the oxidation reactor with the off-gas. The off-gas is cooled and liquefiable components, including water of reaction, are condensed and returned to the reactor. If desired, the water may be separated from the condensate before being recycled to the oxidizer. In another procedure for use at lower pressures, water from an outside source is injected into the reaction medium. This injected water has the effect of reducing the ester number of the oxidate in the same manner in which water of reaction reduces the ester number. However, when water from an outside source is introduced to the reactor operating at the preferred conditions of temperature and pressure, it should not be introduced to the reactor until the oxidation has been initiated, since the presence of the water in the reactor makes difficult the initiation of the oxidation. This fact is demonstrated by Example 4. When conditions more severe than those of Example 4 are employed, for example, at a pressure of 350 p.s.i.g. and higher and a temperature of 200° C. and higher, the oxidation reaction can be initiated in the presence of water.

When this invention is practiced, the ester number of the oxidate containing the desired organic acids can be maintained at a level below 10 and preferably below 5. In fact, the invention can be practiced to maintain the ester number of the oxidate at substantially zero.

This invention is readily adaptable to continuous or batch operation. In either case, after the desired oxidation has been effected, oxidate is removed from the reactor and the acid or acids are recovered, for example, by a crystallization and filtration procedure.

The following procedure was used to determine acid number. A 4 to 5-g. oxidate sample was dissolved in 50 ml. methanol or ethanol, and the solution was titrated to neutrality using 0.1 N NaOH and phenolphthalein indicator. The acid number of the sample was calculated from the formula:

$$\text{Acid No.} = \frac{\text{Ml. alkali} \times N \times 56.1}{\text{Grams sample}}$$

The saponification number was determined by refluxing a separate sample of the oxidate with a known amount of 0.8–0.9 N aqueous KOH in a 1:1 aqueous alcohol solution and determining the amount of alkali consumed by titrating the amount remaining with 0.5 N HCl. The saponification number was calculated from the formula:

$$\text{Sapon. No.} = \frac{(B-S) \times N \times 56.1}{\text{Grams sample}}$$

where S is the ml. HCl required to titrate the sample and B is the ml. HCl required to titrate a blank to which no sample was added. The ester number is the saponification number minus the acid number.

Modifications and advantages of this invention will be readily apparent to those skilled in the art from the above disclosure.

This application is a continuation of my copending application Serial No. 428,368, filed May 7, 1954, now abandoned.

What I claim and desire to protect by Letters Patent is:

1. In a process for oxidizing a methylated benzene having not more than two methyl groups in liquid phase with an oxygen-containing gas in the presence of an oxidation catalyst to the corresponding acid at a temperature of 80–250° C. and at a pressure not exceeding 400 p.s.i., the improvement of initiating the oxidation under substantially anhydrous conditions, condensing the water of reaction, and returning said water of reaction to the reaction mixture as the reaction proceeds in the amount to provide a water concentration of 0.5 to 50% by weight whereby the ester number of the reaction mixture is substantially reduced.

2. In a process for oxidizing a methylated benzene having not more than two methyl groups in liquid phase with an oxygen-containing gas in the presence of an oxidation catalyst to the corresponding acid at a temperature of 80–250° C. and at a pressure not exceeding 400 p.s.i., the improvement of initiating the oxidation under substantially anhydrous conditions, withdrawing a substantial amount of water resulting from the oxidation reaction in the gaseous phase from said reaction, and injecting water from an outside source into the reaction mixture as the reaction proceeds in an amount such that the reaction mixture contains a water concentration within the range of 0.5 to 50% by weight and sufficient to reduce substantially the ester number of said reaction mixture.

3. The process of claim 1 wherein the methylated benzene is p-xylene, the oxygen-containing gas is air, the catalyst is a cobalt salt of an organic acid, the temperature is 125° to 175° C., and the pressure is a superatmospheric pressure not above 200 p.s.i.g.

References Cited in the file of this patent

UNITED STATES PATENTS

| | | |
|---|---|---|
| 1,815,985 | Pansegrau | July 28, 1931 |
| 2,680,757 | Himel | June 8, 1954 |
| 2,727,921 | Taves | Dec. 20, 1955 |